No. 734,535. PATENTED JULY 28, 1903.
J. G. FREDERICK.
CHURN.
APPLICATION FILED FEB. 16, 1903.
NO MODEL.
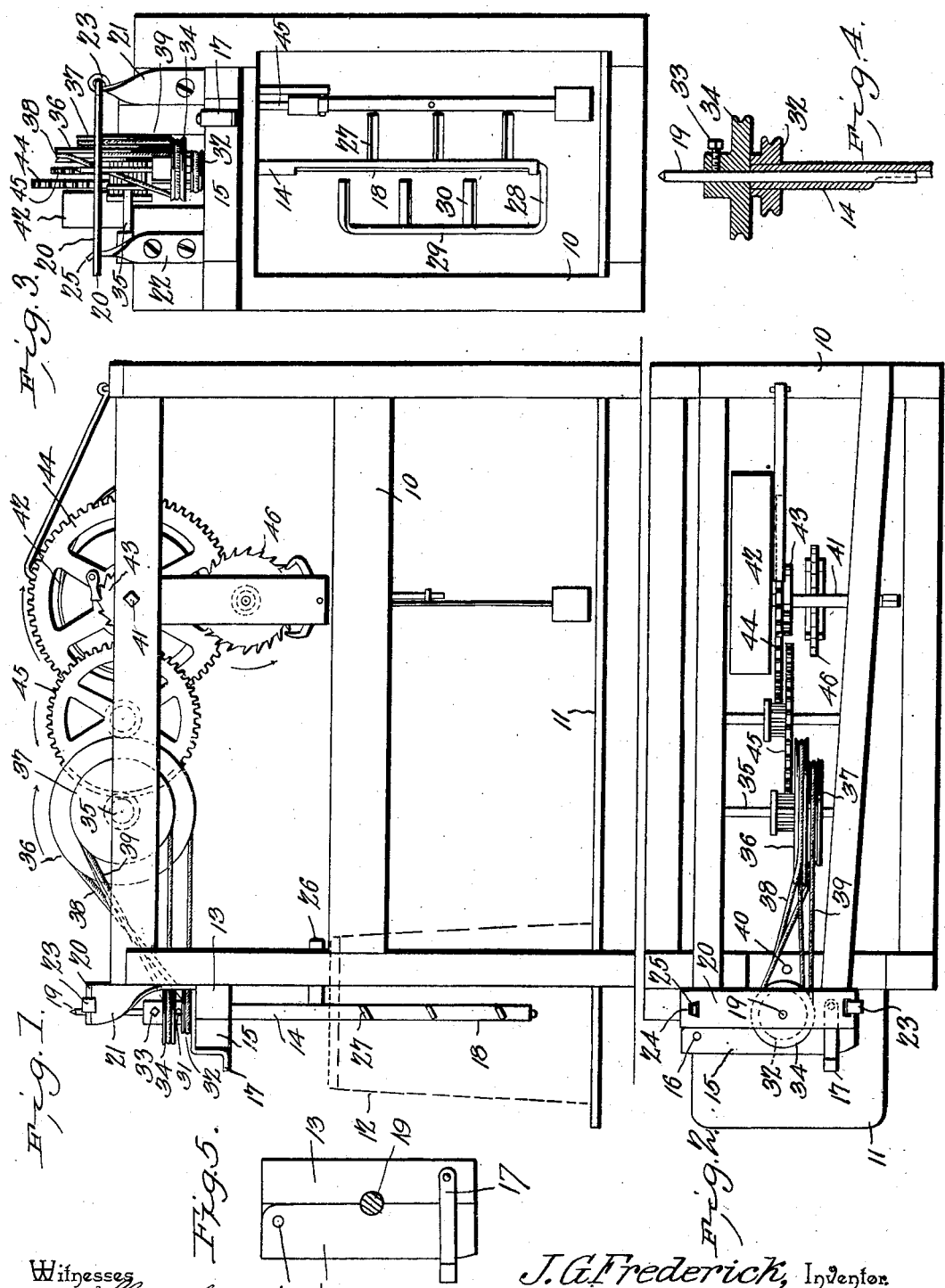
Witnesses
E. W. Stewart
C. N. Woodward.
J. G. Frederick, Inventor.
by C. A. Snow & Co.
Attorneys No. 734,535. Patented July 28, 1903.

UNITED STATES PATENT OFFICE.

JEREMIAH G. FREDERICK, OF STOKER, TEXAS.

CHURN.

SPECIFICATION forming part of Letters Patent No. 734,535, dated July 28, 1903.

Application filed February 16, 1903. Serial No. 143,592. (No model.)

*To all whom it may concern:*

Be it known that I, JEREMIAH G. FREDERICK, a citizen of the United States, residing at Stoker, in the county of Nacogdoches and State of Texas, have invented a new and useful Churn and Means for Operating the Same, of which the following is a specification.

This invention relates to churns and means for operating the same, and has for its object to produce an improved construction whereby the action on the cream is accelerated and the time and labor required to produce the desired results decreased; and the invention consists in certain novel features of construction, as hereinafter shown and described, and specified in the claims.

In the drawings illustrative of the invention, in which corresponding parts are denoted by like designating characters, Figure 1 is a side elevation. Fig. 2 is a plan view. Fig. 3 is a front elevation. Fig. 4 is an enlarged sectional detail illustrating the construction of the shaft-driving mechanism. Fig. 5 is a detail view of the shaft-bearing.

The supporting-framework is represented at 10 with a platform 11 for supporting the churn, (indicated by dotted lines at 12.) This frame may be of any required shape or size or of any suitable material and will be provided with a transverse bar 13, having a half-bearing for the reception of a hollow shaft 14, the latter forming one portion of the dasher-supporting mechanism, and held in position by a cap-bar 15, provided with the opposing half-bearing and completing the holding means for the hollow shaft.

The cap-bar 15 is hinged at one end, as at 16, to the bar 13 and movably connected, as by clips 17, to the bar at the other end to enable the shaft 14 and its attachments to be removed when required. Mounted for rotation within the hollow shaft 14 is a solid shaft 18, extending above the hollow shaft, as at 19, and supported by a cap-plate 20, the latter detachably connected by its ends to standards 21 22, rising from the frame 10, as shown. The plate 20 will preferably be hinged, as at 23, to the standard 22 and provided with an aperture 24, engaging a spring-stud 25 upon the standard 21, the spring possessing sufficient strength to support the shaft held by it against all strains to which it will be subjected while in operation, but which will yield when sufficient force is applied to overcome its resiliency.

The hollow shaft is provided with spaced dasher-blades 27 with their faces inclined from the horizontal and extending radially from the shaft, as shown, and also provided with a flat blade 26 above the churn-top to prevent flies or other insects getting into the churn.

The shaft member 18 extends below the hollow shaft member 14 and extends laterally, as at 28, and thence upwardly parallel to the hollow shaft and spaced therefrom, as at 29, and provided with dasher-blades 30, spaced apart, extending alternately with the blades 27 and inclined reversely thereto, as shown.

Attached to the hollow shaft 14, as by set-screw 31, above the members 13 15 is a relatively small grooved pulley 32, and similarly secured to the shaft 18 by a set-screw 33 above the pinion 32 is a relatively larger grooved pulley 34, it being obvious that the two shafts 14 18 may be independently operated by power applied to the pulleys 32 34.

Mounted for rotation upon the frame 10 is a shaft 35, having a grooved pulley 36, of relatively large diameter and with its cable-groove in operative alinement with the cable-groove of the smaller pulley 32, and carried by the same shaft 35 is a relatively smaller grooved pulley 37 with its cable-groove in operative alinement with the larger pulley 34, as shown.

The differences in the diameters of the pulleys 32 34 will correspond to the distance from center to center of the cable-grooves of the pulleys 36 37, so that an endless cable 38 will run from the pulley 36 to the pulley 32, and a similar endless cable 39 will run from the pulley 37 to the pulley 34, as shown, one of the cables being preferably reversely disposed, so that the pulleys and the dasher-blades controlled by them may be run in opposite directions.

Rising from the bar 13 is a stud 40, adapted to receive and temporarily support the pulleys 32 34, while the dasher-shafts are removed from the churn to permit removal of the churn for discharging its contents, the pulleys 32 34 being in practice first removed from shafts 14 19 and placed upon the stud prior to the removal of said shafts and churn.

Mounted for rotation upon the frame 10 is a main drive-shaft 41, having a coiled spring 42, winding-ratchet 43, and drive-gear 44, the gear connected by a train of gears 45 to shaft 35, by which the latter may be driven. The train of gears will preferably be provided with an escapement mechanism (represented at 46) to control the speed, all these parts being of the usual construction.

The reversely-inclined and oppositely-moving alternating blades 27 30 cause the cream to roll over and over, and thus produces a greatly-improved action and a more rapid separation of the particles of butter, while at the same time not injuriously affecting it.

Any desired speed may be imparted to the dasher-blades, and the mechanism may be constructed in any desired size.

It will be noted that by this simple arrangement the relative sizes of the driving and driven pulleys may be so proportioned that both the shafts 14 18 may be driven at the same speed, but may be likewise arranged for operation at different speeds, if required.

Having thus described my invention, what I claim is—

1. In an apparatus of the character described, a supporting-frame, a churn supported upon said frame, a hollow shaft mounted for rotation upon said frame and extending within the churn and having spaced dasher-blades projecting therefrom, the uppermost of said blades having its operative faces vertical and operating above the churn, and the remainder of the blades inclined from a horizontal plane, an inner shaft supported for rotation within said hollow shaft and with an upwardly-turned extension carrying spaced dasher-blades alternating with the dasher-blades upon said hollow shaft and with their operative faces inclined reversely thereto, and means for rotating said shafts in opposite directions, substantially as described.

2. In an apparatus of the character described, a supporting-frame having a transverse bar provided with a half-bearing, an arm provided with the opposite half-bearing and movably connected by one end to said bar, a clip detachably coupling the other end of said arm to said bar, a hollow shaft supported for rotation by said bearing, an inner shaft supported for rotation by said hollow shaft, standards extending from said supporting-frame, a bearing-plate having a bearing engaging the upper end of said inner shaft and movably connected by its ends to said standards, drive-pinions carried respectively by said hollow shaft and said solid shaft between said bearing-bars and bearing-plate, and means for operating said pinions, substantially as described.

In testimony that I claim the foregoing as my own I have hereto affixed my signature in the presence of two witnesses.

JEREMIAH G. FREDERICK.

Witnesses:
  W. W. IRELAND,
  W. F. SHIRLEY.